United States Patent [19]
Ueda

[11] 3,911,452
[45] Oct. 7, 1975

[54] SELF-PROCESSING CAMERA
[75] Inventor: Hiroshi Ueda, Nara, Japan
[73] Assignee: Minolta Camera Kabushiki Kaisha, Osaka, Japan
[22] Filed: July 30, 1974
[21] Appl. No.: 493,196

[30] Foreign Application Priority Data
Aug. 1, 1973 Japan.............................. 48-85868
Aug. 4, 1973 Japan.............................. 48-87240

[52] U.S. Cl..................................... 354/83; 354/86
[51] Int. Cl.² ........................................ G03B 17/50
[58] Field of Search ............. 354/83, 84, 85, 86, 87

[56] References Cited
UNITED STATES PATENTS
3,673,940  7/1972  Harvey.............................. 354/83 X
3,691,920  9/1972  Harvey.................................. 354/86
3,699,862  10/1972  Kindig.................................. 354/83
3,703,134  11/1972  Harvey.................................. 354/83

Primary Examiner—Monroe H. Hayes
Attorney, Agent, or Firm—Wolder & Gross

[57] ABSTRACT

A self-processing camera is adapted to receive and contain a plurality of film units, each including an image recording unit consisting of a light sensitive sheet and a superimposed image receiving sheet, with a rupturable portion containing processing agent provided on one side of image recording unit and a trap for receiving excessive processing agent provided on the other side thereof. After each film unit has been exposed, it is individually transported by a film unit transporting frame, so as to effect the processing of the image recording unit as well as the discharge of the image recording unit thus processed. The transporting frame effects a reciprocating movement relative to the camera body, and means are provided to prevent the frame from moving in a reverse direction at least when in the advancing movement, so the exposed film unit is carried between and through pressure members which rupture the portion containing the processing agent and cause the processing agent to be uniformly distributed over the image recording unit. At the completion of the advancing movement, the transporting frame is released from said reverse-movement-prevented condition to effect a return motion, thereby separating the exposed image recording unit from the film unit and then discharging the former outside the camera body.

12 Claims, 17 Drawing Figures

SELF-PROCESSING CAMERA

BACKGROUND OF THE INVENTION

This invention relates to a self-processing camera, wherein a film unit, after being subjected to exposure, is transported by means of a transporting device, so that an image recording unit, separably coupled to the film unit, is subjected to processing, then separated from the film unit, and then discharged to the exterior of a camera body.

In U.S. Pat. No. 3,691,920, there is shown a self-processing camera which uses film units each including an image recording unit having a light sensitive sheet and image receiving sheet which is integral therewith. Each film unit also includes a processing fluid-containing-portion provided on one side of the image recording unit and a trap for receiving excessive processing fluid which is provided on the other side thereof. Each film unit is transported after same has been exposed, so that the processing fluid is distributed over the image recording unit and the image recording unit is discharged to the outside of the camera body.

It is an object of the present invention to provide a self-processing camera, wherein a reciprocating film unit transporting device is provided for transporting a film unit which has been subjected to exposure in such a manner as to achieve positive and stable processing of an image recording unit which has been exposed, as well as ensuring the discharge of the image recording unit to the outside of the camera body.

Another object of the invention is to provide a self-processing camera, wherein a film unit transporting device is reciprocated with respect to the camera body so as to transport an image recording unit subjected to exposure, together with the film unit, the image recording unit passing between pressure members which are in pressure-contacting relation to each other, so that processing agent is uniformly distributed over the image recording unit so as to process same. The film unit transporting device is prevented from being moved in an opposite direction during the course of advancing movement thereof, and upon completion of the advancing movement, the device is released from the reverse movement-prevented condition to effect a returning movement, during which the image recording unit thus processed is separated from the film unit and then discharged to the outside of the camera body.

Still another object of the present invention is to provide a self-processing camera of the character described wherein after said film unit transporting device has been advanced to its fullest extent and is then released from the reverse movement-prevented condition to thereby effect a returning movement, the device is prevented from moving in a reverse direction during the returning movement, thereby ensuring separation of the image recording unit from the film unit as well as the discharge of same to the outside of the camera body.

A further object of the present invention is to provide a self-processing camera of the character described, in which there is provided a governor adapted to act on the film unit transporting device either in the advancing movement or in the returning movement, so as to provide a regulated and controlled movement for uniform processing of the image recording unit and accurate separation of the image recording unit from the film unit.

A further object of the present invention is to provide a film unit transporting device for a self-processing camera of the character described, which device includes a drive member adapted to be brought into a cocked position due to either the advancing movement or the returning movement of the film unit, while driving the transporting device due to the other movement.

Those and other objects of the present invention will be apparent from the ensuing part of the specification in conjunction with drawings which indicate preferred embodiments of the invention.

SUMMARY OF THE INVENTION

In accordance with the present invention, there is provided a self-processing camera having an exposure chamber adapted to receive a film unit casing containing a plurality of film units in stacked, registering relationship therein, and having an exposure opening. Each of the film units includes an image recording unit consisting of a light sensitive sheet superimposed with an image receiving sheet, a portion at one side of the unit containing processing fluid, and a trap at the other side of the unit for receiving excess processing agent. The camera also includes a film unit transporting frame mounted for reciprocating movement relative to the camera body between a set position within the camera body and a withdrawn position, said frame including means for engaging the film unit which faces the exposure opening and carrying said film unit, during movement of said frame to its withdrawn position, between pressure members which distribute the processing agent over the image recording unit. On the return movement of the transporting frame to its set position, the processed film unit is guided to a delivery opening in the rear wall of the camera, which is adapted to separate the image recording unit from the film unit and discharge the former outside the camera body, while the remainder of the film unit is inserted into the rear of the film unit casing through an inlet opening therein.

The camera also includes means for preventing a reverse movement of the film unit transporting frame, said means being adapted to prevent the film unit transporting frame from moving in an opposite direction at least during the advancing movement from the set position within the exposure chamber to the withdrawn position, and adapted to release same from the reverse-movement-prevented condition when the frame reaches its withdrawn position.

The first feature of the present invention resides in that both the processing and the discharge of an exposed image recording unit are effected by means of a film unit transporting frame reciprocating relative to the camera body, so that replacement of the exposed image recording unit by an unexposed image recording unit within a film unit casing is facilitated, as is the successively positioning of unexposed film units in front of an exposure opening of the film unit casing. The second feature is that distribution of the processing agent over the exposed image recording unit is effected through the advancing movement of the film unit transporting frame, and discharge of the image recording unit thus processed is conducted through the returning movement of the frame, so as to achieve successive operations in a positive manner. The third feature of the present invention lies in that the film unit transporting frame, when in the advancing movement, is prevented from moving in a reverse direction before the advancing movement is completed, so that processing agent may be uniformly distributed over the exposed image recording unit, thereby avoiding uneven processing. The fourth feature of the present invention resides in structure which assures that, even when in the returning movement following completion of the advancing movement, the film unit transporting frame is prevented from moving in a reverse direction, so as to avoid formation of wrinkles on the image recording unit to be discharged. The fifth feature of the present invention is the provision of a governor which is actuated during the returning movement of the film unit transporting frame, whereby progress of the processing of the image recording unit is rendered constant, thereby presenting a stable image on the image receiving sheet.

DETAILED DESCRIPTION OF THE INVENTION

Figure 1:
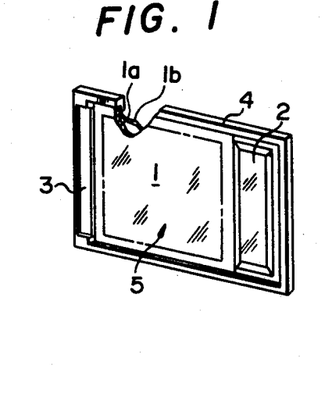
FIG. 1 is a perspective view of a film unit used in the camera of the present invention, the film unit being shown partly broken away to reveal inner structural detail.

Referring in detail to the drawings, there is shown in FIG. 1 a film unit 5 according to the present invention, which includes a light sensitive sheet 1a and an image receiving sheet 1b, which are mutually superimposed into a unitized image recording unit 1. Image recording unit 1 is removably mounted on frame 4, while a portion 2 containing a processing agent 2 is securely attached to frame 4 on one side of the image recording unit 1, and a trap 3 for receiving excessive processing agent is securely attached to frame 4 on the other side of image recording unit 1.

A plurality of film units 5 are stacked in registry within film-unit casing 6 in a manner to be resiliently urged under the action of springs 6a against exposure aperture 6d.

Figure 2:
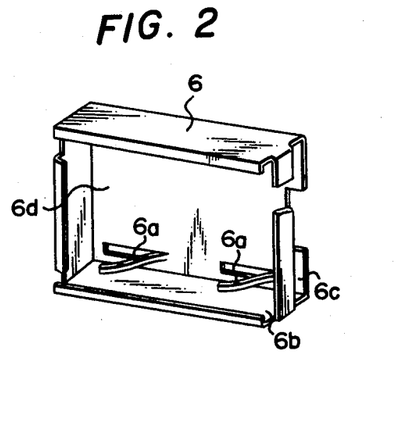
FIG. 2 is a perspective view of a film unit casing adapted to contain a plurality of film units of the type shown in FIG. 1.

Film unit casing 6, as best seen in FIG. 2, has in its front portion, bent edges defining the exposure aperture 6d, and provided at one end with a film unit outlet opening 6b, through which each successive film unit is withdrawn after exposure. Provided rearwardly of outlet opening 6b is a film unit inserting opening 6c, and the pair of springs 6a are disposed on the rear wall of casing 6. The film unit 5, which has been subjected to exposure, is pulled out through said outlet opening to the outside of casing 6 for development, then image recording unit 1, to which the processing agent has been applied, is separated from frame 4, and inserted through film unit inserting opening 6c to be housed within the film unit casing 6, as will be described in detail hereinafter.

Figure 3:
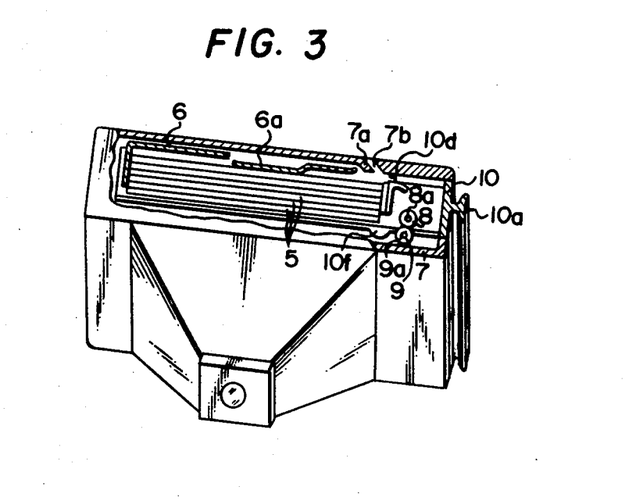
FIG. 3 is a perspective view showing the external appearance as well as the basic construction of a self-processing camera according to the present invention, the upper portion of the camera being shown partly broken away and in section to reveal inner structure.
Figure 4:
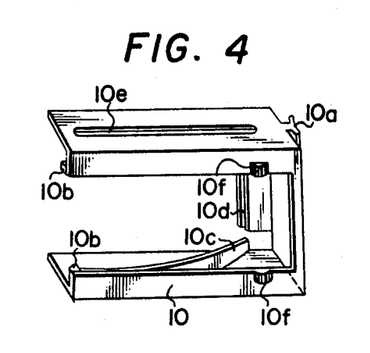
FIG. 4 is a perspective view of a film-unit transporting frame for use with the self-processing camera of FIG. 3.

The self-processing camera using the aforesaid film units is shown in FIG. 3 and includes exposure chamber 7, in which the aforesaid film unit casing 6 is mounted, with the exposure opening 6d thereof facing a photographic lens.

A pair of press rollers, 8,9 are rotatably mounted on shafts 8a, 9a supported within the exposure chamber 7 adjacent to the film unit casing 6. The shaft 8a is rigidly mounted in the exposure chamber, while the roller 9 is biased by a leaf spring 9b, shown in FIG. 8, toward roller 8, so as to be resiliently pressed against the roller 8.

On the rear wall of exposure chamber 7 is an indented peeling portion 7a for separating image recording unit 1 from frame 4, and adjacent thereto is a delivery opening 7b for discharging the image recording unit thus separated. The delivery opening 7b is normally covered with a resilient liner (not shown) of rubber or like material, so as to prevent leakage of light into exposure chamber 7.

Within exposure chamber 7 is slideably mounted a film unit transporting device, which, as best seen in FIGS. 4–7, includes a film unit transporting frame 10 having a grip 10a and a guide slot 10e. Film unit transporting frame 10 is movable between a set position within the exposure chamber 7 and a withdrawn position outside the exposure chamber, with the aid of guide slot 10e and the aforesaid shaft 8a of roller 8.

Film unit transporting frame 10 has grip 10a on one side, two upper and lower hook portions 10b on the other side, and a leaf spring 10c extending along the bottom wall thereof. Upper and lower hook portions 10b are engageable with only the frontmost frame 4 of film unit 5 which faces and is exposed to the exposure opening 6d of film unit casing 6. Provided on the rear wall of film unit transporting frame 10 is a stepped portion 10d, which faces the free end of leaf spring 10c.

Figure 5:
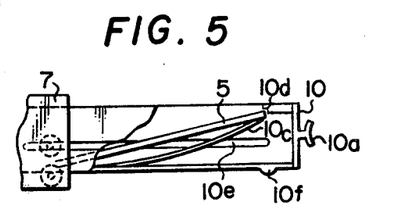
FIG. 5 is a fragmentary top plan view of the film-unit transporting frame of FIG. 4 during its advancing movement from a set position within the camera body towards a withdrawn position.

FIG. 3 shows the film unit transporting frame in its set position within the exposure chamber 7. If the film unit transporting frame 10 is slid outwardly from said set position within the exposure chamber as shown in FIG. 5, upper and lower hook portions 10b come into engagement with frame 4 of the frontmost film unit 5 which has been subjected to exposure, whereby said film unit 5 is withdrawn from exposure chamber 7 along with the film unit transporting frame 10. At that time, projections 10f provided on the front surface of film transporting frame 10, act to separate press roller 9 from stationary roller 8 against its biased tendency, so that the leading end of the film unit 5 being withdrawn may readily pass between said rollers. When projections 10f pass press roller 9, the latter is biased back to a position in which the pair of rollers 8, 9 press the processing agent containing portion 2 of film unit 5 to rupture same, whereby processing agent is uniformly distributed over light sensitive sheet 1a and image receiving sheet 1b to process those sheets in the course of the advancing movement of the film unit 5 to the withdrawn position, while excessive processing agent is received for storage in trap 3. During the above advancing movement of the film unit to the withdrawn position, the leading end of film unit 5 is urged under the action of leaf spring 10c against the rear wall of film transporting frame 10, until the leading end comes into contact with the stepped portion 10d and is retained by the latter, as shown in FIG. 5.

Figure 6:
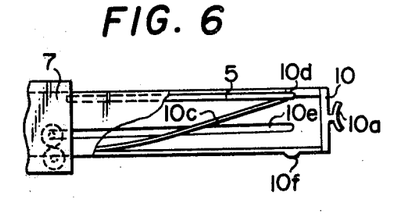
FIG. 6 is a fragmentary top plan view of the film-unit transporting frame similar to FIG. 5, but showing the frame after it has reached its fully withdrawn position.
Figure 7:
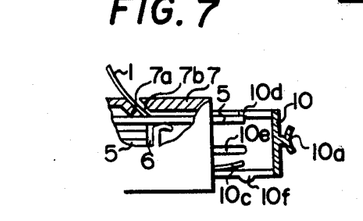
FIG. 7 is a fragmentary top plan view of the film-unit transporting frame, during the returning movement to the set position within an exposure chamber from the withdrawn position, with portions broken away and shown in section.

When the trailing end of film unit 5 detaches from rollers 8, 9, the entire film unit 5 is brought flat against the rear wall of frame 10, as shown in FIG. 6. With the film unit 5 maintained in this condition, if film unit transporting frame 10 is pushed back toward its set position within exposure chamber 7, then stepped portion 10d grips and carries the leading end of frame 4 of film unit 5, whereby the film unit 5 is drawn in a left-hand direction as viewed in FIG. 6, and the trailing end of image recording unit 1 comes into engagement with peeling portion 7a of the exposure chamber. Thus, the image recording unit 1 is separated from frame 4 and delivered through delivery opening 7b to the outside of camera, while frame 4 passes through inserting opening 6c of film unit casing 6 to be placed in the rearmost position in said casing.

Where the film unit transporting frame is manually moved to the withdrawn position and then back to the set position by the simple sliding reciprocating motion described above, such manual manipulation of the frame is troublesome and leads to a handling of the film unit transporting frame which is not consistent, resulting in variations in the speed of withdrawal of the film unit transporting frame from exposure chamber 7. In particular, in the event that the film unit transporting frame is abruptly withdrawn from the chamber, breaking of the film unit may occur, accompanied by a rupturing of the portion containing the film processing agent, and consequent leakage of the agent to the outside of the film unit where it may stain the camera. Even if such an accident is avoided, it is doubtful that uniform distribution of the processing agent to the light sensitive sheet 1a and the receiving sheet 1b will result, so that there will be failure to achieve uniform processing.

FIGS. 8 through 12 show one embodiment of camera incorporating mechanism which eliminates the aforementioned difficulties through a series of gearing which controls the movement of the film unit transporting frame.

Figure 8:
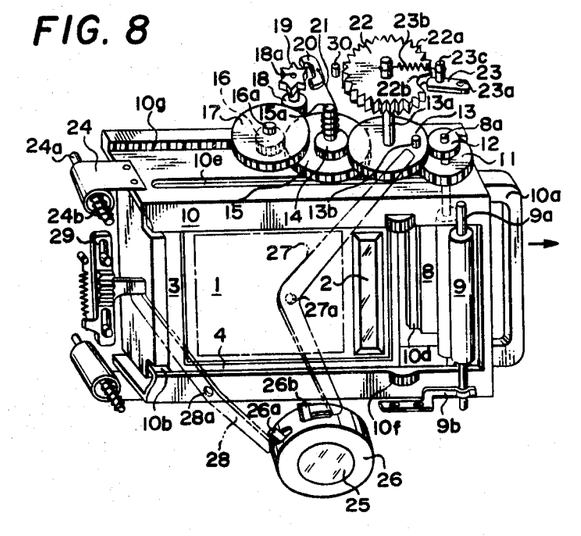
FIG. 8 is a perspective view illustrating essential parts of the internal construction of a first embodiment of the self-processing camera of the present invention, in which the film-unit transporting frame is in its set position within the exposure chamber.
Figure 9:
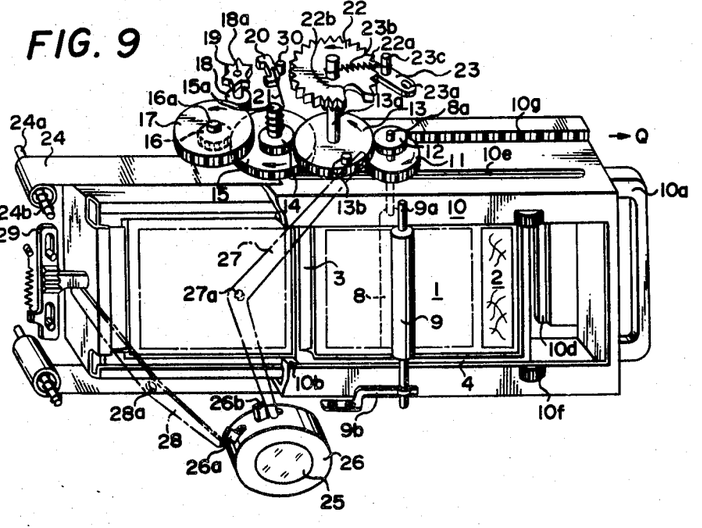
FIG. 9 is a perspective view of the self-processing camera similar to FIG. 8, but showing the transporting frame in the withdrawn position.
Figure 10:
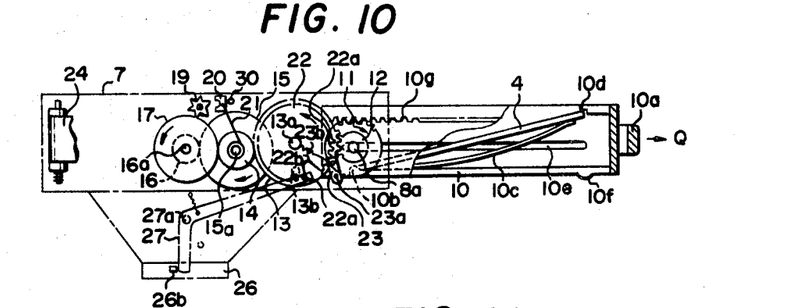
FIG. 10 is a top plan view partially in section, of the self-processing camera, showing the film-unit transporting frame in the advancing movement from its set position within the exposure chamber to the withdrawn position.

FIGS. 8 shows gears 11, 12 which are rigidly mounted coaxially on shaft 8a of roller 8, said shaft 8a being loosely fitted in guide slot 10e in film unit transporting frame 10 which extends in the direction of reciprocating motion of said frame. Provided on the top of film unit transporting frame 10 and extending parallel to the guide slot 10e is a rack 10g which meshes with the gear 11, so that the linear reciprocating movement of film unit transporting frame 10 is converted to rotational movement of shaft 8a.

A gear 13 is mounted on a rotary shaft 13a and meshes with the aforesaid gear 12 to thereby be reduced in r.p.m., also secured to rotary shaft 13a is a ratchet wheel 22 having teeth 22a and a cut-away portion 22b presenting a gap having no teeth. A ratchet pawl 23, adapted to engage the aforesaid ratchet wheel 22, is rotatably supported on a shaft (not shown) which is journalled in exposure chamber 7 by means of a shaft hole 23a. A spring 23b, confined between a pin 23c of ratchet pawl 23 and shaft 13a of ratchet wheel 22, urges the ratchet pawl 23 in a direction towards the aforesaid shaft 13a.

The above described gears are so arranged that, when the film unit transporting frame 10 is shifted from the set position within exposure chamber 7 to the withdrawn position, for transportation of a single film unit, the ratchet wheel 22 is turned substantially through one complete revolution. Also, when the film unit transporting frame is in the set position within the exposure chamber, as well as when it is in the fully withdrawn position therefrom, the aforesaid ratchet pawl 23 is positioned in the cut-away portion 22b. The relationship between the ratchet pawl 23 and the ratchet wheel 22 is such that when the ratchet pawl 23 is positioned in the aforesaid cut-away portion 22b of ratchet wheel 22, once the ratchet wheel 22 is rotated either in the clockwise direction or in the counter-clockwise direction, the ratchet pawl 23 is fitted in such a direction that it will not grip a tooth 22a of ratchet wheel 22, so long as the ratchet wheel 22 continues to rotate in the same direction, thereby permitting rotation in one direction. On the other hand, if the ratchet wheel 22 tends to reverse its rotation, the fitted ratchet pawl 23 is brought into gripping engagement with a tooth 22a of ratchet wheel 22, thereby preventing such reverse rotation of ratchet wheel 22, so that the ratchet wheel may continue to rotate only in the original direction. The reverse rotation of ratchet wheel 22 cannot occur until the ratchet wheel 22 completes one full rotation in the original direction and ratchet pawl 23 becomes loosely fitted in the cut-away portion 22b of ratchet wheel 22.

Securely attached to film unit transporting frame 10 is one end of a spring member 24, which may be a coil spring as shown in FIG. 8, and which is wound around a shaft 24a, with its other end securely attached to said shaft. The shaft 24a is non-rotatably supported within the exposure chamber 7, and is surrounded by an auxiliary spring 24b. The spring member 24 is adapted to be loaded or tensioned during the shift of film unit transporting frame 10 to the withdrawn position, so as to urge the film unit transporting frame 10 back to its set position.

A gear 14 meshes with the gear 13, and is rigidly mounted on a shaft 15a coaxially with a gear 15, which is also rigidly mounted on the shaft 15a. Rigidly mounted on a shaft 16a is a gear 16 which meshes said gear 15, and also rigidly mounted on shaft 16a is a speed-increasing gear 17, with which a gear 18 meshes. The gear 18 is rigidly mounted on a shaft 18a on which is also rigidly mounted an escape wheel 19.

An anchor 20, which cooperates with the escape wheel 19, is movably supported on a frictional interconnecting member 21, to which rotation of the shaft 15a is transmitted. When shaft 15a is rotated in a counter-clockwise direction, the anchor 20 and escape wheel 19 are brought into engagement with each other, thereby providing a governor or escapement. When shaft 15a is rotated in a clockwise direction, anchor 20 is retracted, by means of the frictional interconnecting member 21, out of engagement with escape wheel 19, and comes to rest against stop member 30, being maintained thereby in its disengaged position.

A lever 27 is supported in the exposure chamber by means of a shaft hole 27a therein, and has one end adapted to engage a pin 13b upstanding from the gear 13 when photographic lens 25 and shutter 26 are set in a photographic position. The other end of lever 27 is engageable with a cocking lever 26b of shutter 26.

A lever 28, pivotally mounted in the exposure chamber by means of a shaft hole 28a, has one end adapted to engage a shutter release finger piece 29 mounted on the front wall of the exposure chamber, and the other end adapted to engage a release lever 26a of shutter 26.

Figure 11:
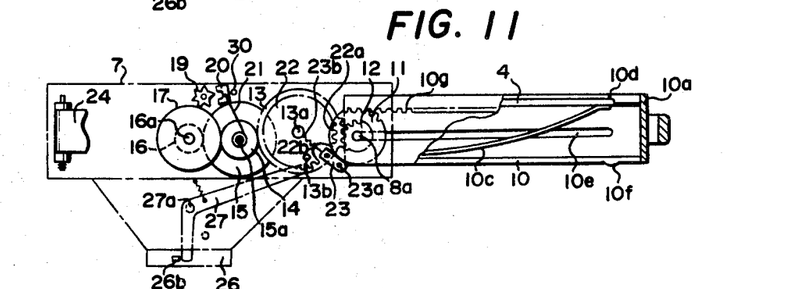
FIG. 11 is a top plan view partially in section of the self-processing camera similar to FIG. 10, but showing completion of the shift of the film-unit transporting frame to the withdrawn position.

With the construction described, when photographic lens 25 and shutter 26 are in the photographic position, as shown in FIG. 8, if the finger piece 29 is manipulated to actuate the cocked shutter 26, release lever 26a of shutter 26 is actuated by way of lever 28, and the image recording unit 1 of the frontmost film unit 5 facing the exposure opening is subjected to exposure. Subsequently, if film unit transporting frame 10 is pulled, by holding grip 10a, in the direction of arrow Q shown in FIGS. 9 and 10 against the force of spring member 24, the film unit 5 thus exposed is pulled out from the exposure chamber 7 together with film unit transporting frame 10, and thus processing of the exposed film unit starts. At the same time, the above movement of frame 10 causes gears 11 and 12 to rotate in a clockwise direction, to thereby rotate gear 13 and ratchet wheel 22 in a counter-clockwise direction. Rotation of the ratchet wheel 22 in the counter-clockwise direction is continued, without being reversed, due to engagement of ratchet pawl 23 with teeth 22a for preventing reverse rotation of said ratchet wheel, so that film unit transporting frame 10 can be shifted in the withdrawing direction Q only. Simultaneously with the above movement, gears 14, 15 and shaft 15a are rotated in the clockwise direction, and the frictionally interconnecting member 21 connected to shaft 15a comes to bear on stop member 30 for maintaining governor members 19 and 20 inoperative, so that coil spring 24 may be pre-loaded or pre-tensioned, as the film unit transporting frame shifts towards the withdrawn position. When film unit transporting frame 10 comes to the fully withdrawn position and frame 4 is urged flat against the rear wall of film unit transporting frame 10 under the action of leaf spring 10c, as shown in FIG. 11, ratchet pawl 23 extends freely within cut-away portion 22b of ratchet wheel 22 which has completed one cycle of rotation, whereby film unit transporting frame 10 is ready for its return movement.

Figure 12:
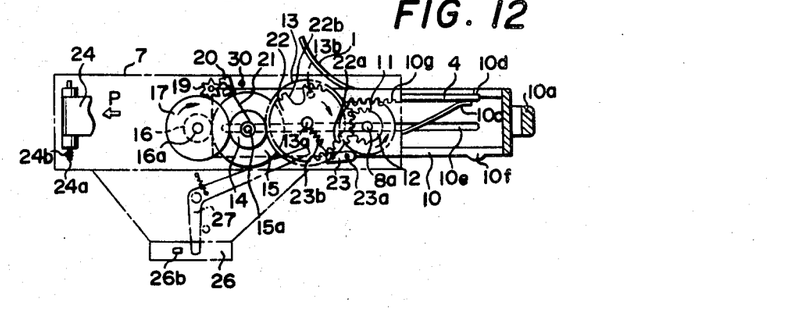
FIG. 12 is a top plan view partially in section similar to FIG. 11, but showing the film-unit transporting frame in its return movement towards the set position within the exposure chamber from the withdrawn position.

Thus, if grip 10a is released, film unit transporting frame 10 is pulled by the fully loaded spring member 24 is the direction of arrow P as shown in FIG. 12 to start the return movement. During such return movement, film unit transporting frame 10 is prevented from moving in the opposite direction Q due to ratchet pawl 23 and teeth 22a of ratchet wheel 22. Meanwhile, shaft 15a in turn is rotated in a counter-clockwise direction, to thereby bring governors 19 and 20 into an operative condition by way of frictionally interconnecting member 21, whereby film unit transporting frame 10 will be shifted under spring tension to its original set position while being regulated in speed under the action of the governor, during which the exposed image recording unit 1 is positively separated from the film unit 5 and then discharged through delivery opening 7b. Thus, the film unit transporting frame is returned to its set position within the exposure chamber as shown in FIG. 8. When film unit transporting frame 10 is returned to its set position, ratchet pawl 23 again enters the cut-away portion 22b of ratchet wheel 22, so as to permit the subsequent movement of film unit transporting frame 10 towards the withdrawn position.

Due to the reciprocating movement of film unit transporting frame 10, pin 13b engages and actuates lever 27, causing lever 27 to push charge lever 26b of shutter 26 in the counter-clockwise direction, whereby shutter 26 will be cocked.

FIGS. 13 through 17 illustrate another embodiment of the present invention, in which components identical or equivalent in construction to those of the first embodiment are given identical reference numerals, while components identical in function but different in construction are indicated by prime reference numerals. Newly added components are identified by different reference numerals.

The second embodiment is distinguished from the first embodiment in that a spring member is employed to advance film unit transporting frame 10 in the withdrawing direction, a governor unit is adapted to act only when the film unit transporting frame is shifted in the withdrawing direction, and there is provided a locking lever adapted to lock the film unit transporting frame 10 when in the set position within the exposure chamber and adapted to unlock same in association with the shutter release operation of the camera. Those differences will be referred to hereinafter.

Figure 13:
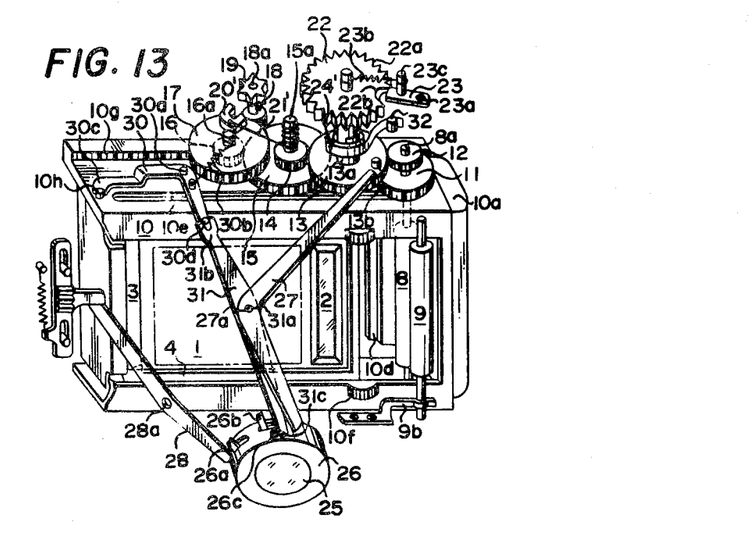
FIG. 13 is a perspective view illustrating an essential part of the internal construction of a second embodiment of the self-processing camera according to the present invention, and showing the film-unit transporting frame in its set position.
Figure 14:
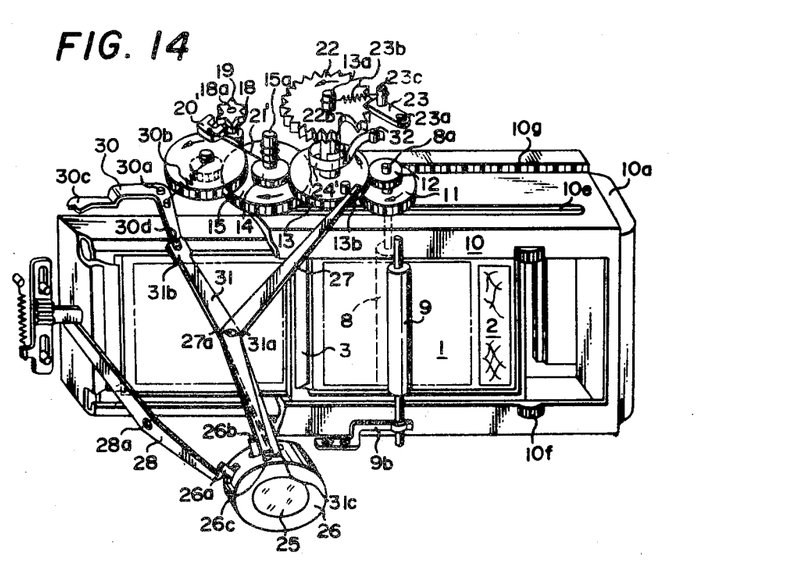
FIG. 14 is a perspective view of the second embodiment similar to FIG. 13, but showing the film-unit transporting frame in the advancing movement from its set position within the exposure chamber to the withdrawn position.
Figure 15:
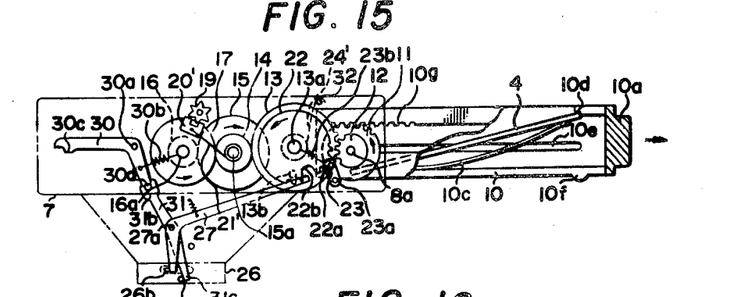
FIG. 15 is a top plan view partially in section of the camera portion in the position shown in FIG. 14.

Leaf spring 24' is securely connected at one end to shaft 13a of ratchet wheel 22 which is the same in construction as that of the first embodiment, and wound about shaft 13a, with the other end attached to a fixed pin 32 secured within the exposure chamber. Leaf spring 24' is adapted to be cocked in the course of the returning movement of film unit transporting frame 10 from the withdrawn position to the set position within the exposure chamber.

A locking lever 30 is pivotally mounted in the exposure chamber by means of shaft 30a and is urged in a counter-clockwise direction under the action of a spring 30b. One end of locking lever 30 is formed with a hook portion 30c engageable with a locking pin 10h when film unit transporting frame 10 is cocked in the set position within the exposure chamber. The other end of locking lever 30 is provided with a coupling pin 30d.

A transmission lever 31 is pivotally mounted coaxially with the lever 27 in the exposure chamber by means of shaft hole 31a. The transmission lever 31 has a forked portion 31b at one end which engages the coupling pin 30d. The other end 31c of lever 31 is in engagement with a stop member 26c provided on shutter 26, and is engageable with shutter charge lever 26b when shutter lever 26b is in the shutter release position.

Wound about shaft 15a is frictionally interconnecting member 21' mounting anchor 20' which cooperates with escape wheel 19, the shaft 15a having gear 14 rigidly mounted thereon and meshing with gear 13 mounted on the shaft 13a. The relationship between anchor 20' and escape wheel 19 is such that when shaft 15a is rotated in a clockwise direction, anchor 20' is brought into engagement with escape wheel 19, thereby providing a governor or escapement. When shaft 15a is rotated in a counter-clockwise direction, anchor 20' is retracted from escape wheel 19.

Thus, if film unit transporting frame is pushed into the set position within the exposure chamber, leaf spring 24 is cocked and pin 10h of film unit transporting frame 10 is brought into engagement with hook portion 30c of locking lever 30, thereby locking film unit transporting frame 10 against the action of spring 24.

Due to the release operation, shutter 26 is actuated, and upon completion of the exposure, cocking lever 26b moves into engagement with the end 31c of transmission lever 31 and urges the latter in a counter-clockwise direction as viewed in FIG. 13, whereby locking lever 30 is urged in the clockwise direction against the force of spring 30b through the engagement of forked portion 31b with transmission pin 30d, thereby releasing engagement of hook portion 30c with locking pin 10h. Thus, film unit transporting frame 10 is shifted under the action of leaf spring 24', carrying therewith a film unit which has been subjected to exposure. The frame 10 moves from the set position within the exposure chamber to the withdrawn position shown in FIGS. 14 and 15. During the above movement, anchor 20' moves into contact with escape wheel 19 so that the governor will function in an escapement action to control the moving speed of the film unit transporting frame, whereby distribution of processing agent to the exposed image recording unit is effected.

Figure 16:
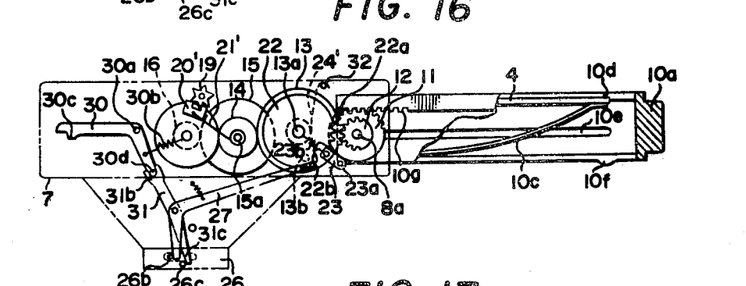
FIG. 16 is a top plan view partially in section similar to FIG. 15, but showing completion of the shifting of the film-unit transporting frame to the withdrawn position; and, FIG. 17 is a top plan view partially in section similar to FIG. 16, but showing of the camera, the film-unit transporting frame during its return movement from the withdrawn position to the set position within the exposure chamber.

When film unit transporting frame 10 comes to the withdrawn position, ratchet pawl 23 will extend loosely within cut-away portion 22b of ratchet wheel 22 as shown in FIG. 16, whereby film unit transporting frame 10 is prepared for its return motion.

Figure 17:
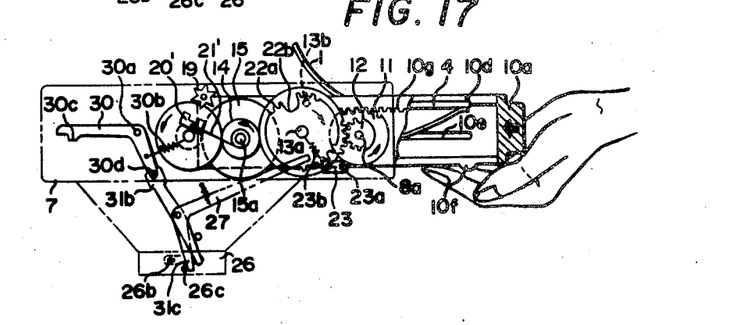

If film unit transporting frame 10 is manually pushed by means of grip 10a as shown in FIG. 17, film unit transporting frame 10 is shifted from the withdrawn position towards the set position within the exposure chamber to cock leaf spring 24'. At that time, anchor 20' is retracted from escape wheel 19, thereby bringing the governor into an inoperative condition. In the course of the returning movement of film unit transporting frame 10, image recording unit 1 is separated from frame 4 and then delivered to the outside of the camera, while pin 13b of gear 13, rotating in the clockwise direction, urges lever 27 in a clockwise direction, thereby cocking shutter 26. When film unit transporting frame 10 is set in position within the exposure chamber, locking lever 30 is turned into engagement with pin 10h, thereby locking the film unit transporting frame 10 in the set position within the exposure chamber, and thus the condition as shown in FIG. 13 is reestablished.

As many apparently widely different embodiments of this invention may be made without departing from the spirit and scope thereof, it is to be understood that the invention is not limited to the specific embodiments thereof except as defined in the appended claims.

I claim:

1. In a self-processing camera including an exposure chamber adapted to mount therewithin a film unit casing containing a plurality of film units, said film units each having a separable image recording unit, a rupturable portion containing a processing agent on one side of said image recording unit, and a trap for receiving excessive processing agent on the other side thereof, said film unit casing having a front exposure opening, a film unit outlet opening adjacent said exposure opening, and a film unit inserting opening, located rearwardly of said outlet opening, the improvement which comprises:

a film unit transporting frame movable relative to the exposure chamber between a first set position within the exposure chamber and a second withdrawn position outside the exposure chamber, means on said transporting frame for engaging the single frontmost film unit in said casing when said frame is in the first set position, and for transporting said single film unit out through said outlet opening of said casing when said frame is shifted to said second position from said first position, means on said frame for moving the trailing end of said single film unit to a position aligned with said inserting opening when said frame has reached said second position, whereby, when said transporting frame is shifted back from said second position to said first position, said film unit is carried thereby through said inserting opening, to a position within said film unit casing;

pressure members mounted within said exposure chamber in pressure-contacting relation to each other adjacent to said outlet opening, and adapted to rupture the processing-agent-containing portion of the film unit being transported, thereby distributing processing agent to the image recording unit of said transported film unit when said transporting frame is shifted from the first position to the second position;

a rotary member operatively associated with said frame and adapted to rotate when said frame is moved between its first and second positions and to detect a position of said transporting frame;

reverse motion preventive members for preventing reverse motion of said transporting frame during the shift of said frame from the first position to the second position, said reverse motion preventive members releasing said frame from the reverse motion-prevented condition when said frame is in said first position and in said second position; and means for separating the image recording unit from the film unit, and for discharging the image recording unit to the outside of the exposure chamber, when said transporting frame is shifted from the second position to the first position.

2. A self-processing camera as defined in claim 1, wherein said reverse motion preventive members are positioned to prevent reverse motion of said transporting frame while said frame is shifted from the second position to the first position.

3. A self-processing camera as defined in claim 1, wherein said reverse motion preventive members comprise a ratchet pawl, and a ratchet wheel engaging said ratchet pawl and having a cut-away portion, said ratchet wheel effecting substantially one complete rotation in association with rotation of said rotary member when said transporting frame is shifted between the first position and the second position, with said ratchet pawl loosely received in said cut-away portion at the completion of said rotation, whereby said ratchet wheel is disengaged from said ratchet pawl when said film unit transporting frame is in the first position or in the second position.

4. A self-processing camera as defined in claim 1, which further includes projections provided on the film unit transporting frame, and positioned to pass between said pressure members to separate the latter for facilitating insertion of the leading end of a film unit being transported between said pressure members when said transporting frame is shifted from the first position to the second position, and to return said pressure members to their mutually-engaged positions after the leading end of said film unit has been inserted therebetween.

5. A self-processing camera as defined in claim 1, which further includes governor means for controlling the moving speed of said transporting frame when the latter is shifted from the first position to the second position.

6. A self-processing camera as defined in claim 1, which further comprises governor means for controlling the moving speed of said transporting frame when the latter is shifted from the second position to the first position.

7. A self-processing camera as defined in claim 1, which further comprises a driving member adapted to be brought into a cocked position when said transporting frame is shifted from the first position to the second position and causing the shift of said transporting frame from the second position to the first position.

8. A self-processing camera as defined in claim 7, which further comprises governor means brought into operation by said driving member when said transporting frame is driven from the second position to the first position and brought into inoperative condition when said transporting frame is shifted from the first position to the second position against the force of said driving member.

9. A self-processing camera as defined in claim 1, which further comprises a drive member for driving said transporting frame from the first position to the second position, said drive member being adapted to be brought into cocked position when said transporting frame is shifted from the second position to the first position; and a locking member for locking said transporting frame against movement under the force of said drive member when said transporting frame is in the first position, said locking member releasing said frame from its locked position in association with termination of exposure upon release of the camera shutter.

10. A self-processing camera as defined in claim 9, which further comprises governor means brought into operation by said drive member when said transporting frame is shifted from the first position to the second position and rendered inoperative when said transporting frame is shifted from the second position to the first position against the force of said drive member.

11. A self-processing camera as defined in claim 1, wherein said transporting frame has a rack extending parallel to the direction of movement of the frame between the first position and the second position;

said pressure members comprise a first roller mounted on a first shaft journalled in the exposure chamber, and a second roller rotatable with respect to the exposure chamber and mounted on a movable shaft which is biased toward said first shaft; and said rotary member comprises a gear mounted on said first shaft and meshing with said rack.

12. A self-processing camera as defined in claim 1, which further comprises means for cocking the camera shutter when said film unit transporting frame is shifted from the first position to the second position and vice-versa.

* * * * *